Patented Aug. 3, 1926.

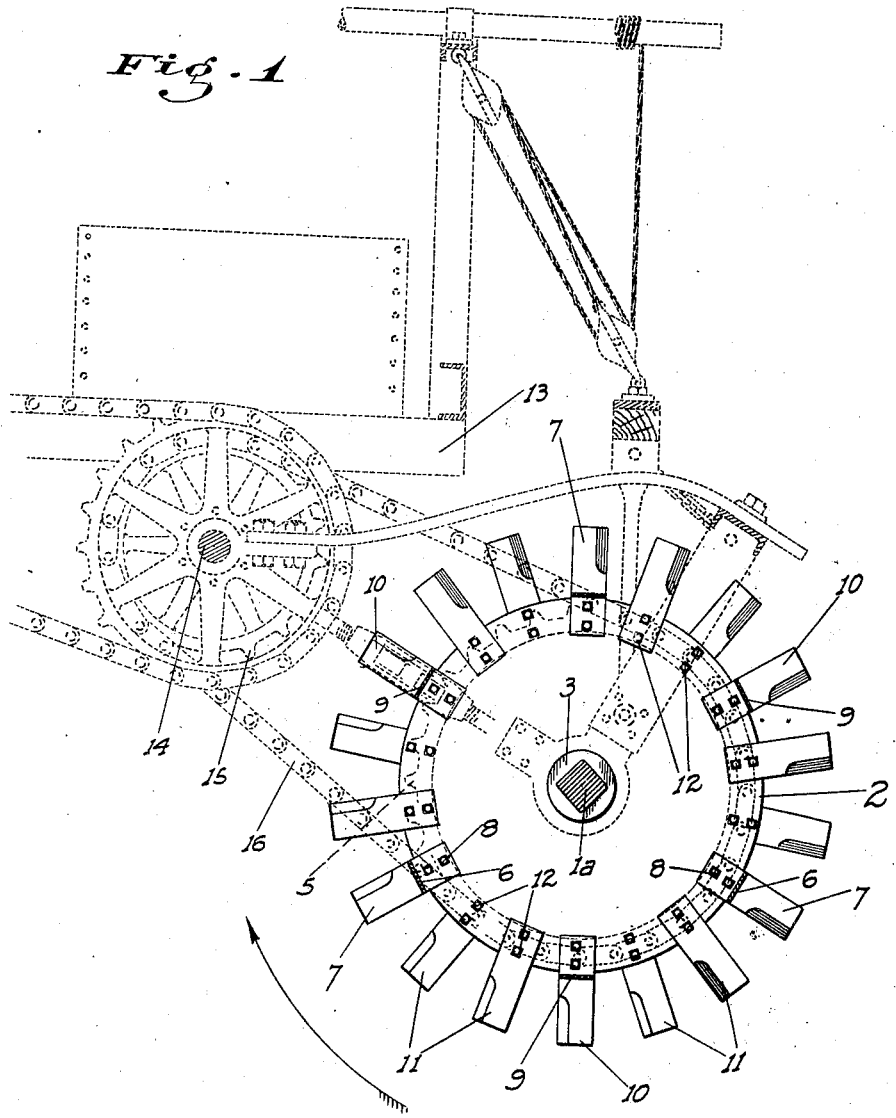

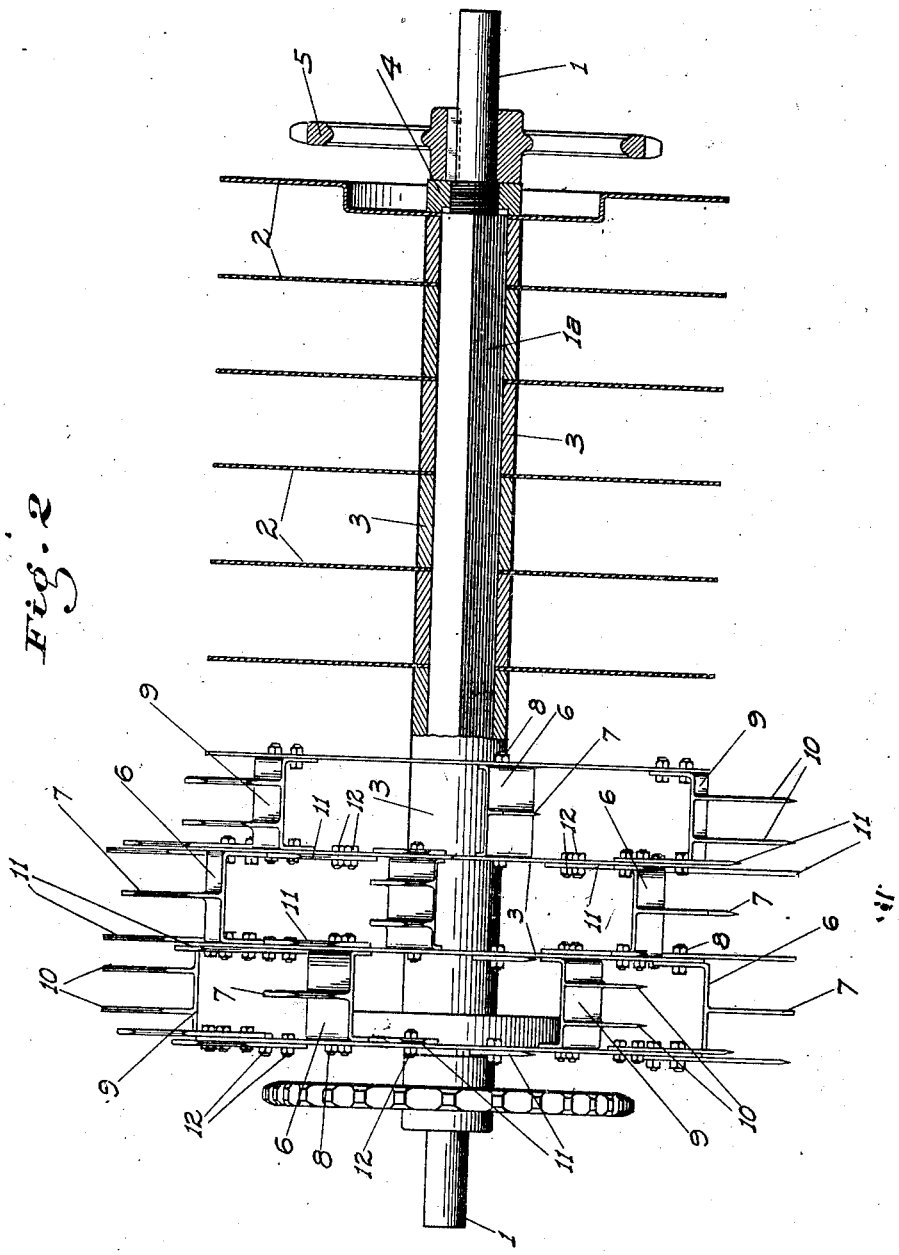

1,594,789

UNITED STATES PATENT OFFICE.

VERNER B. MAY AND DELMER C. MAY, OF STOCKTON, CALIFORNIA.

LAND DIGGER.

Application filed June 25, 1925. Serial No. 39,507.

This invention relates to improvements in earth working implements, our principal object being to provide an implement for cutting into dirt to adjustable depths, and so constructed that it is particularly valuable for cutting, digging out and chopping up the roots of asparagus plants when the latter have ceased to bear properly and it is desired to clear the land of the same.

As is well known the roots of such plants, especially when they have been in the ground a considerable time, form a practically endless mass and tangle, and with present methods it is a very slow, laborious and costly job to dig out the roots.

With our improved implement this work may be thoroughly and expeditiously done at a minimum of cost.

At the same time the use of the implement is not confined to the above purpose, since it is adaptable for general earth working uses.

The apparatus shown in the present application is therefore identical as far as its function is concerned to the structure shown in our co-pending application for patent, filed June 22, 1925, Serial No. 38,744. It is however considerably cheaper to construct and assemble, and is arranged in such a manner that replacement of any part when necessary may be very easily and quickly made.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a side view in section of our digger structure, showing the same in connection with suitable mounting and driving means in dotted outline.

Fig. 2 is a longitudinal elevation of the digging structure, partly in section and with some of the detachable cutting elements omitted.

Referring now more particularly to the characters of reference on the drawings, the numeral 1 denotes a shaft on which the digging structure is mounted. The ends of the shaft are circular so that they may be turnably journaled in suitable bearings, but the major portion of the shaft is square or polygonal sided as shown at 1ª.

Fitted onto the portion 1ª of the shaft are a number of discs 2 of equal diameters. These discs are held in suitably spaced relation by spacer sleeves 3 which are placed onto the shaft between the discs. The discs and sleeves are locked against longitudinal movement on the shaft by nuts 4 on the latter, applied against the end discs. The nuts are then held against retractive movement by the hubs of the driving sprockets 5 which are keyed onto the shaft outwardly of said nuts.

When the discs are thus assembled cutting elements of different forms are applied thereto in such a manner that practically all dirt and any roots in an area extending the full width between the two end discs will be acted on with the rotation of the shaft and discs.

One form of such cutting elements comprises a bridge member 6 adapted to extend between adjacent discs and to be secured thereto by bolts 8. A single radial knife 7 is formed with and projects outwardly from the member 6 centrally of the width thereof. Any desired number of these implements is employed, and they are arranged between each pair of adjacent discs in evenly spaced relation thereabout and in longitudinally alined or circularly offset or staggered relation as may be desired.

Another form of cutting element also used in connection with the above described type consists of a bridge member 9, also adapted to extend between adjacent discs and to be removably secured thereto. This bridge however carries two radially extending knives 10 disposed in symmetrically spaced relation with respect to the spacing between the discs. The same number of these cutting elements is employed as there are of the cutters 7, and they are also disposed in evenly spaced relation about and between each adjacent pair of discs. They are also preferably located centrally between the positions of said other cutting elements 7.

The remaining type of cutting element used consists of a straight knife or blade 11 adapted to be removably fixed directly onto the discs in radial relation thereto by bolts 12. These blades are located about each disc between the other cutters thereon in such a manner that the knives or blades of all the cutting elements form an evenly spaced assembly around the discs, as shown in Fig. 1. The knives 11 are also preferably disposed in alternate alinement on the opposite faces of the discs, so that adjacent knives do not exactly track each other.

By means of this arrangement, it will be seen that a series of cutting elements, fairly closely spaced both circumferentially and longitudinally of the shaft, is pressed to the ground for the full distance between the end discs, so that a corresponding width of ground and any roots therein will be thoroughly acted on. The bridges of the first two described types of cutting elements also serve to efficiently brace the discs against lateral deflection adjacent their outer peripheries, avoiding the necessity of making the discs very thick or heavy.

The shaft is supported in a suitable manner from a travelling frame 13 so as to be capable of vertical adjustment, the structure then swinging about a fixed driving shaft 14 as an axis. This driving shaft is mounted on the frame 13 a certain distance ahead of the cutting structure, and carries sprocket wheels 15, chains 16 passing around said sprockets 15 and 5. The particular mounting and supporting arrangement is however shown and described more particularly in the above mentioned copending application, and we do not feel it necessary therefore to go into the same in detail in this case. The shaft is of course driven in such a manner that it revolves in a direction opposite to the movement of the frame 13, or so that the knives advance into the dirt with the forward movement of the machine.

As with our other machine, the roots are thoroughly dug up, cut to pieces and mostly raised to the surface of the ground, where they may be raked up or subsequently cultivated into the ground. In the same manner even though no roots are being handled, the dirt through which our cutting implement passes will be thoroughly disintegrated and put in excellent shape for planting, with but very little if any subsequent treatment being necessary.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A land digging structure comprising a shaft, a plurality of discs fixed thereon in spaced relation, cutting elements projecting outwardly beyond the peripheries of the discs and located intermediate the discs, and means provided with said elements for securing each one individually to adjacent discs.

2. A land digging structure comprising a shaft, a plurality of discs fixed thereon in spaced relation, radial cutting elements projecting outwardly beyond the peripheries of the discs and located intermediate the discs, and bridge members extending between and secured to adjacent discs, the cutting elements being mounted on and projecting outwardly from corresponding bridge members.

3. A land digging structure comprising a shaft, a plurality of discs fixed thereon in spaced relation, bridge members extending between and secured to adjacent discs in circumferentially spaced relation, and cutting elements projecting outwardly from said bridge members; said cutting elements being arranged in alternately staggered relation transversely of the discs.

4. A land digging structure comprising a shaft, a plurality of discs fixed thereon in spaced relation, radial cutting elements projecting outwardly from and secured to the discs in circumferentially spaced relation, and additional radial cutting elements located between the discs and projecting outwardly therefrom, and disposed in circumferential positions intermediate those of the first named cutting elements.

5. A land digging structure comprising a plurality of spaced discs mounted together as a unit, cutting elements projecting outwardly beyond the peripheries of the discs and located intermediate the same, and members to which the elements are secured extending to and abutting against the adjacent side faces of adjacent discs and secured to such faces.

In testimony whereof we affix our signatures.

DELMER C. MAY.
VERNER B. MAY.